(12) United States Patent
Fujita et al.

(10) Patent No.: US 9,365,300 B2
(45) Date of Patent: *Jun. 14, 2016

(54) ORBIT ATTITUDE CONTROL DEVICE, AND METHOD OF CONTROLLING ORBIT ATTITUDE

(71) Applicant: MITSUBISHI HEAVY INDUSTRIES, LTD., Tokyo (JP)

(72) Inventors: Toshiharu Fujita, Tokyo (JP); Nobuaki Hayakawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 14/018,683

(22) Filed: Sep. 5, 2013

(65) Prior Publication Data

US 2014/0145037 A1 May 29, 2014

(30) Foreign Application Priority Data

Nov. 28, 2012 (JP) ................................. 2012-260151

(51) Int. Cl.
*B64G 1/26* (2006.01)
*G05D 1/08* (2006.01)

(52) U.S. Cl.
CPC ................ *B64G 1/26* (2013.01); *G05D 1/0883* (2013.01)

(58) Field of Classification Search
CPC .... B64G 1/26; B64G 2001/245; B64G 1/401; B64G 1/24; B64G 1/403
See application file for complete search history.

(56) References Cited

U.S. PATENT DOCUMENTS

| 4,550,888 A | 11/1985 | Douglass et al. |
| 4,585,191 A | 4/1986 | Blount |
| 4,786,019 A | 11/1988 | Uken |
| 4,787,579 A | 11/1988 | Smith |
| 4,802,333 A | 2/1989 | Smith |

(Continued)

FOREIGN PATENT DOCUMENTS

| JP | 2000-028300 | 1/2000 |
| JP | 2000-346598 | 12/2000 |

(Continued)

OTHER PUBLICATIONS

U.S. Office Action issued Jan. 5, 2015 in corresponding U.S. Appl. No. 14/018,667.

(Continued)

*Primary Examiner* — Valentina Xavier
(74) *Attorney, Agent, or Firm* — Wenderoth, Lind & Ponack, L.L.P.

(57) ABSTRACT

An orbit attitude control device includes a plurality of nozzles for injecting combustion gas supplied from a combustion chamber, and a control section configured to calculate nozzle opening degree correction values so that a deviation between a detection value of the pressure of the combustion chamber and a command value becomes smaller. The control section is configured to calculate a total correction value so that the deviation between the detection value and the command values becomes smaller. A total value T1 for first group nozzles and a total value T2 for second group nozzles are calculated. The total correction value is distributed to the opening degree correction values for the first group nozzles with a ratio of T2/(T1+T2) and to the opening degree correction values for the second group nozzles with a ratio of T1/(T1+T2).

2 Claims, 7 Drawing Sheets

(56) References Cited

U.S. PATENT DOCUMENTS

| | | | |
|---|---|---|---|
| 4,923,152 A * | 5/1990 | Barkats | 244/171.1 |
| 5,062,593 A | 11/1991 | Goddard et al. | |
| 5,456,425 A | 10/1995 | Morris et al. | |
| 5,456,429 A | 10/1995 | Mayersak | |
| 6,062,512 A | 5/2000 | Wang et al. | |
| 6,315,239 B1 | 11/2001 | Voigt | |
| 6,340,138 B1 | 1/2002 | Barsky et al. | |
| 6,393,830 B1 * | 5/2002 | Hamke et al. | 60/229 |
| 6,598,385 B1 | 7/2003 | Abel et al. | |
| 7,716,912 B2 * | 5/2010 | Cover et al. | 60/228 |
| 8,244,417 B2 | 8/2012 | Chilan | |
| 8,528,316 B2 | 9/2013 | Baker et al. | |
| 8,735,788 B2 * | 5/2014 | Preston et al. | 244/3.22 |
| 2004/0195363 A1 | 10/2004 | Kato et al. | |
| 2007/0204593 A1 | 9/2007 | Cover et al. | |
| 2010/0168938 A1 | 7/2010 | Seo et al. | |
| 2010/0269484 A1 | 10/2010 | Baker et al. | |
| 2011/0277446 A1 | 11/2011 | Stroud et al. | |

FOREIGN PATENT DOCUMENTS

| | | |
|---|---|---|
| JP | 2004-251181 | 9/2004 |
| JP | 2007-231951 | 9/2007 |
| JP | 2008-164246 | 7/2008 |
| JP | 2011-236903 | 11/2011 |

OTHER PUBLICATIONS

United States First Office Action issued Apr. 16, 2015 in related U.S. Appl. No. 14/018,698.

Notice of Allowance issued Sep. 29, 2015 in U.S. Appl. No. 14/018,667.

Final Office Action issued May 22, 2015 in co-pending U.S. Appl. No. 14/018,667.

Notification of Reasons for Refusal issued Mar. 8, 2016 in Japanese Application No. 2012-260151, with partial English translation.

Notification of Reasons for Refusal issued Mar. 8, 2016 in Japanese Application No. 2012-259005, with partial English translation.

* cited by examiner

ORBIT ATTITUDE CONTROL DEVICE, AND METHOD OF CONTROLLING ORBIT ATTITUDE

INCORPORATION BY REFERENCE

This application is based upon and claims the benefit of priority from Japanese patent application No. 2012-260151, filed on Nov. 28, 2012, the disclosure of which is incorporated herein in its entirety by reference.

TECHNICAL FIELD

The present invention relates to a technique for controlling an orbit of a flying object.

BACKGROUND ART

Technologies for controlling an attitude or orbit of a flying object flying through space or the atmosphere have been developed. In a system typically called DACS (Divert and Attitude Control System), an attitude control thruster for controlling an attitude of the flying object and an orbit control thruster for changing an orbit are used for controlling the attitude and orbit.

Patent Literature 1 discloses one example of a thruster control method. The method includes: detecting a pressure of a combustion chamber, comparing the detected pressure with a predetermined pressure value, and changing discharge areas of a plurality of nozzles for substantially same amount so that the pressure of the combustion chamber becomes the predetermined pressure, based on a difference between the detected pressure and the predetermined pressure.

CITATION LIST

[Patent literature 1] U.S. Pat. No. 5,456,425

SUMMARY OF THE INVENTION

A combustion gas is supplied to a plurality of nozzles included in a thruster from a common combustion chamber. The each nozzle includes a valve which is controlled based on a designated opening degree command value. Each nozzle injects the combustion gas with an amount corresponding to the opening degree, and thereby an orbit attitude of the flying object is controlled.

A pressure of the combustion chamber for supplying the combustion gas of the thruster is desirably kept constant. Accordingly, the opening degree of the valve of the nozzle is controlled so that the pressure of the combustion chamber is kept constant. However, in fact, when the opening degree command value is inputted so as to keep the pressure of the combustion chamber constant, there is a case where the pressure of the combustion chamber changes unpredictably because of various disrupting factors. As such disrupting factors, a mechanical accidental error, thermal expansion of the valve or the like, and ununiformity of a fuel or the like are considered. It is expected that the pressure of the combustion chamber is controlled to be kept constant in order to maintain stable combustion.

Moreover, when operation amounts are largely biased in a plurality of nozzles included in the thruster, conditions of nozzles are easily varied. Accordingly, it is desired that the nozzles are evenly used.

An orbit attitude control device according to the present invention includes: a plurality of nozzles configured to inject a combustion gas supplied from a combustion chamber, wherein opening degrees of the plurality of nozzles are configured to be controlled in response to opening degree command values; and a control section configured to calculate nozzle opening degree correction values that are correction values for opening degree command values of the plurality of nozzles so that a deviation between a detection value of a pressure of the combustion chamber and a command value of the pressure becomes smaller, and correct the opening degree command values by the nozzle opening degree correction values. A first group nozzles belonging to a first group of the plurality of nozzles are configured to inject combustion gas in opposite directions along a first axis, and a second group nozzles belonging to a second group of the plurality of nozzles are configured to inject combustion gas in opposite directions along a second axis. The control section is configured to calculate a total correction value that is a correction value for a total value of the opening degree command values of the plurality of nozzles so that the deviation between the detection value of the pressure and the command value of the pressure becomes smaller, calculate a total first group opening degree value T1 that is a total value of the opening degree command values of the first group nozzles, and a total second group opening degree value T2 that is a total value of the opening degree command values of the second group nozzles, distribute the total correction value into the first group opening degree correction value with a ratio of $T2/(T1+T2)$ and into the second group opening degree correction value with a ratio of $T1/(T1+T2)$, calculate the nozzle opening degree correction values for the first group nozzles so that a total value becomes the first group opening degree correction value, and calculate the nozzle opening degree correction values for the second group nozzles so that a total value becomes the second group opening degree correction value.

A method of controlling an orbit attitude according to the present invention includes: inputting opening degree command values for opening degrees of a plurality of nozzles which inject a combustion gas supplied from a combustion chamber; calculating nozzle opening degree correction values that are correction values for opening degree command values of the plurality of nozzles so that a deviation between a detection value of a pressure of the combustion chamber and a command value of the pressure becomes smaller; and calculating the nozzle opening degree correction values for the plurality of nozzles based on the opening degree command values to correct the opening degree command values by the nozzle opening degree correction values. A first group nozzles belonging to a first group of the plurality of nozzles are configured to inject combustion gas in opposite directions along a first axis, and a second group nozzles belonging to a second group of the plurality of nozzles are configured to inject combustion gas in opposite directions along a second axis. The calculating nozzle opening degree correction values includes: calculating a total correction value that is a correction value for a total value of the opening degree command values of the plurality of nozzles so that the deviation between the detection value of the pressure and the command value of the pressure becomes smaller; calculating a total first group value T1 that is a total value of the opening degree command values of the first group nozzles, and a total second group value T2 that is a total value of the opening degree command values of the second group nozzles; distributing the total correction value into the first group correction value and the second group correction value based on a ratio of the total first group value and the total second group value; calculating the nozzle opening degree correction values for the first group nozzles so that a total value becomes the first group correction value; and calculating the nozzle opening degree correction values for the second group nozzles so that a total value becomes the second group correction value.

According to the present invention, an orbit attitude control device and a method of controlling an orbit attitude can be provided, which are able to control the thruster with keeping the pressure of the combustion chamber constant. Moreover, according to the present invention, an orbit attitude control device and a method of controlling an orbit attitude are provided, which are able to suppress a variation in operation amounts of the plurality of nozzles.

DESCRIPTION OF EMBODIMENTS

[Configuration of a Thruster]

Figure 1A:
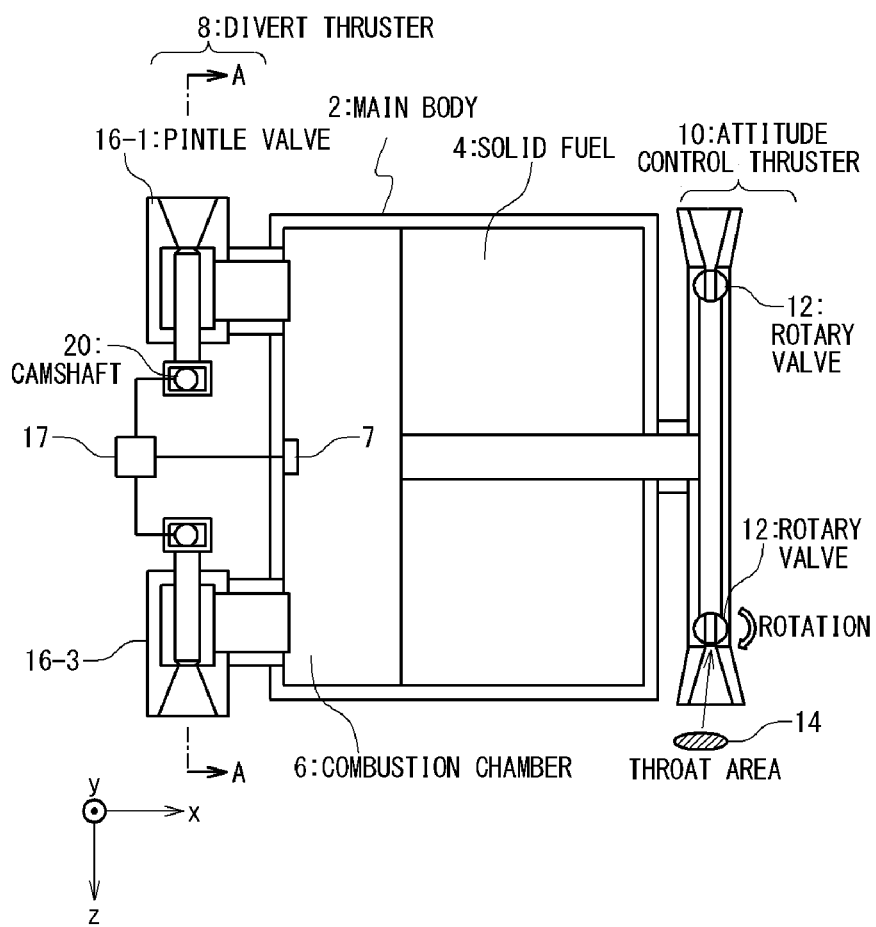
FIG. 1A is a sectional view showing an attitude control device.
Figure 2A:
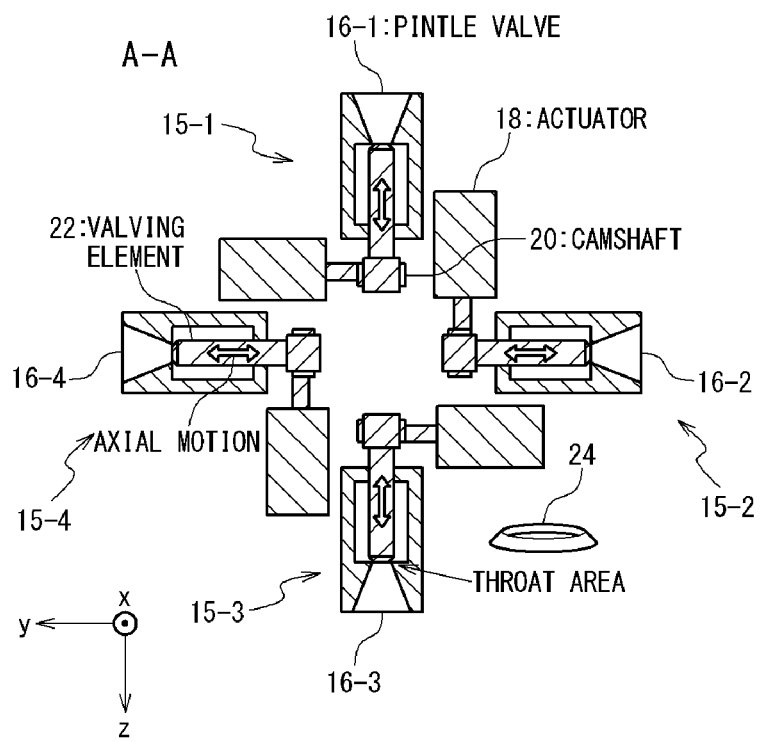
FIG. 2A is a sectional view showing a divert thruster.

With reference to the drawings, embodiments will be described. FIG. 1A is a cross-sectional view showing an attitude control device according to the present embodiment. A flying object including this attitude control device has an outer shape which is almost symmetrical to the x-axis illustrated in the drawing, and is propelled roughly along the x-axis direction. FIG. 2A is a sectional view showing A-A cross-section of a divert thruster 8 of FIG. 1A.

Figure 1B:
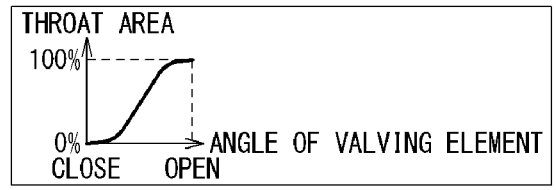
FIG. 1B is a graph indicating a relationship between an angle of a valving element and a throat area.

A solid fuel 4 is arranged inside a main body 2 of the attitude control device. When the flying object flies, the solid fuel 4 combusts and a combustion chamber 6 inside the main body 2 is filled with combustion gas. An internal pressure of the combustion chamber 6 is detected by a combustion pressure sensor 7. A relatively small part of the combustion gas is supplied to an attitude control thruster 10. The attitude control thruster 10 includes a plurality of nozzles which face to radial directions of a cylindrical coordinate system whose center is the x-axis (a directions in YZ-plane whose start points are arranged on the x-axis in FIG. 1A). Each of the plurality of nozzles includes a rotary valve 12. An opening degree of the rotary valve 12 is controlled by an electrical signal. The combustion gas supplied to the attitude control thruster 10 is injected from the each nozzle for an amount corresponding to the opening degree of the rotary valve 12, and thereby the attitude of the flying object is controlled. A shape 14 of an opening portion of the rotary valve 12 is indicated in a lower right part of FIG. 1A. FIG. 1B shows a graph indicating a relationship between an angle of a valving element and a throat area of the rotary valve 12.

A relatively large part of the combustion gas of the combustion chamber 6 is supplied to the divert thruster 8. The divert thruster 8 includes a plurality of nozzles 15-1 to 15-4 which face to radial directions of the cylindrical coordinate system whose center is the x-axis (directions in YZ-plane whose start points are arranged on the x-axis in FIG. 1A). The plurality of nozzles 15-1 to 15-4 includes pintle valves 16-1 to 16-4, respectively.

Figure 2B:
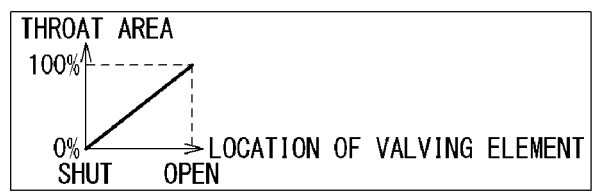
FIG. 2B is a graph indicating a relationship between a location of a valving element and a throat area.

Opening degree command values concerning the pintle valves 16-1 to 16-4 are provided, based on a wireless communication with an outside of the flying object or data stored in a storage device included in the flying object. A control section 17 controls actuators 18, based on the opening degree command values and a detection value of a pressure of the combustion chamber 6 which is detected by the combustion pressure sensor 7. The actuators 18 control opening degrees of the pintle valves 16-1 to 16-4. The combustion gas supplied to the divert thruster 8 is injected from the each of the nozzles 15-1 to 15-4 for an amount corresponding to the opening degrees of the pintle valves 16-1 to 16-4, and thereby the attitude of the flying object is controlled. A shape of an opening portion of the each of the pintle valves 16-1 to 16-4 is indicated in a lower right part of FIG. 2A. FIG. 2B is a graph indicating a relationship between location of a valving element and a throat area of the each of pintle valves 16-1 to 16-4.

Figure 3:
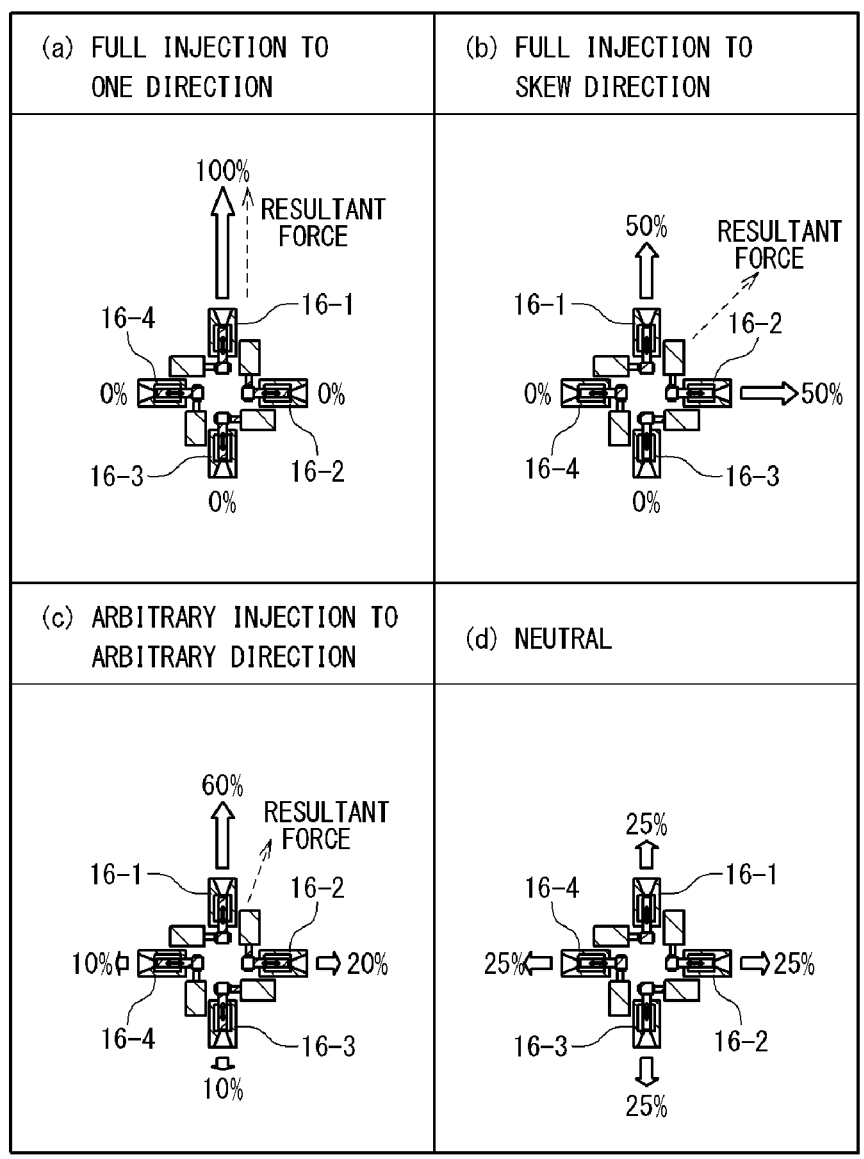
FIG. 3 is a diagram for explaining distribution of opening degrees in the divert thruster.

With reference to FIG. 3, a method of distributing opening degrees of the divert thruster 8 will be explained, which is a basis of the present embodiment. When the solid fuel 4 stably combusts, a generation amount of the generated combustion gas in a unit of time is substantially constant. Accordingly, a flow rate of the combustion gas supplied to the outside from the combustion chamber 6 is desirably kept constant. In particular, it is desired that a flow rate of the combustion gas injected from the divert thruster 8 whose injection amount is large is kept constant. Therefore, the opening degree of the each pintle valve is controlled so that a total of throat areas of the pintle valves 16-1 to 16-4 included in the divert thruster 8 is a constant (this constant value is assumed to be 100%). The combustion pressure of the combustion chamber 6 is kept constant by such control, and a transitive fluctuation of the combustion pressure is suppressed.

FIG. 3(a) to (d) shows four pintle valves 16-1 to 16-4, respective percentages of throat areas, and a resultant force by injections from the pintle valves 16-1 to 16-4. As shown in FIG. 3(a), when the opening degree of the pintle valve 16-1 is 100% and the pintle valves 16-2 to 16-4 are fully closed, the resultant force acts along an upper direction in the drawing (the negative direction along the z-axis) and the orbit of the flying object is changed to be opposite direction of the resultant force. As shown in FIG. 3(b), when the opening degree of the each of pintle valves 16-1 and 16-2 is 50% and the pintle valves 16-3 and 16-4 are fully closed, the resultant force acts along an upper right direction and the orbit of the flying object is changed to be opposite direction of the resultant force. When the resultant force by the injection of the divert thruster is required to be reduced, as shown FIG. 3(c), a pintle valve facing to one direction and a pintle valve facing to the opposite direction are simultaneously opened. For example, in FIG. 3(c), the pintle valve 16-3 facing to the positive direction along the z-axis is opened with opening degree of 10%, and the pintle valve 16-1 facing to the negative direction along the z-axis is opened with opening degree of 60%. As a result, a force is obtained, which is equal to a resultant force that is obtained when the pintle valve facing to the negative direction along the z-axis is opened with opening degree of 50%. If the orbit is not to be changed by the divert thruster 8, as shown in FIG. 3(*d*), in the pintle valves 16-1 to 16-4, the pintle valves facing to each other are set to be same opening degree.

[Reference Example]

When the pintle valves 16-1 to 16-4 are controlled by a fixed total opening degree command value, the combustion pressure of the combustion chamber 6 does not necessarily become constant, because of disturbing factors such as mechanical errors, thermal expansions of valves or the like, and ununiformity of the fuel and so on. Accordingly, feed back control for total opening degree of the divert thruster 8 is carried out by using the detection value of the combustion pressure sensor 7, so that the pressure of the combustion chamber 6 becomes constant.

Figure 4A:
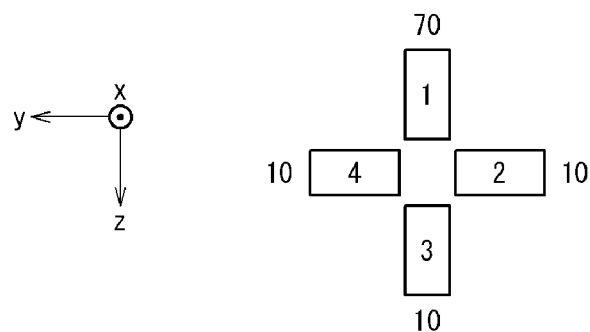
FIG. 4A is a diagram showing a distribution of opening degrees to pintle valves when a total opening degree command value is changed in the divert thruster.
Figure 4B:
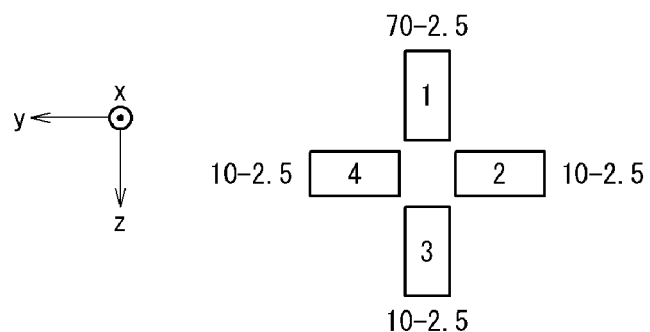
FIG. 4B is a diagram showing a distribution of opening degrees to pintle valves when a total opening degree command value is changed in the divert thruster.

FIGS. 4A and 4B show an example of control in a case where the detection value of the pressure of the combustion chamber 6 is smaller than a set value and the total opening degree of the divert thruster 8 is controlled to be reduced. By reducing the total opening degree, an injection amount of the combustion gas is reduced, and the pressure of the combustion chamber 6 increases.

FIG. 4A indicates a case where the total opening degree command value of the divert thruster 8 is 100%, 70% of it is distributed to the pintle valve 16-1, and 10% of it is distributed to each of the pintle valves 16-2 to 16-4. At this state, it is assumed that the detection value of the pressure of the combustion chamber 6 is smaller than the set value and the total opening degree command value is changed to be 90% by addition of a total correction value of −10%. In this example, the total correction value is evenly distributed to all pintle values 16-1 to 16-4. As shown in FIG. 4B, by evenly distributing the total correction value of −10% to the all pintle valves 16-1 to 16-4, the pressure of the combustion chamber 6 is increased, keeping the direction of the resultant force the same.

On the contrary, when the detection value of the pressure of the combustion chamber 6 is larger than the set value and the total opening degree of the divert thruster 8 is controlled to be increased, a positive total correction value is added (the total opening degree is increased) and the injection amount of the combustion gas increases to decrease the pressure of the combustion chamber 6. In this case, by changing a symbol of the correction value for the opening degree of the pintle valve (−2.5% in FIG. 4B) to be opposite, the pressure of the combustion chamber can be controlled to be kept constant.

[Embodiment]

Figure 5A:
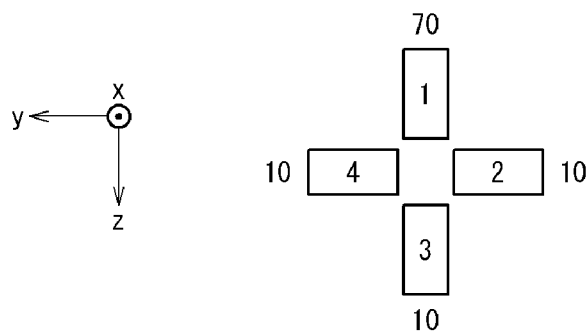
FIG. 5A is a diagram showing a distribution of opening degrees to pintle valves when a total opening degree command value is changed in the divert thruster.
Figure 5B:
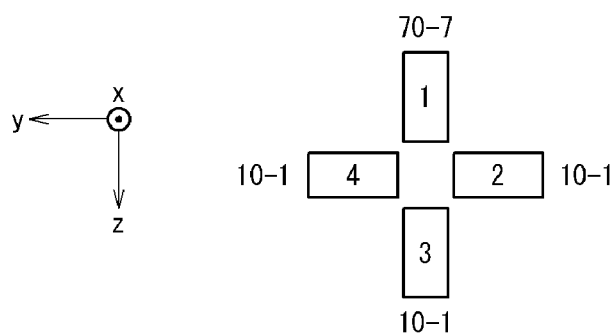
FIG. 5B is a diagram showing a distribution of opening degrees to pintle valves when a total opening degree command value is changed in the divert thruster.

Next, an embodiment according to the present invention will be explained. FIGS. 5A and 5B show an example of control in a case where the detection value of the pressure of the combustion chamber 6 shifts from the set value and the total opening degree of the divert thruster 8 is controlled to be changed. FIG. 5A shows a case where the total opening degree command value of the divert thruster 8 is 100%, 70% of it is distributed to the pintle valve 16-1, and 10% of it is distributed to each of the pintle valves 16-2 to 16-4. At this state, a case is shown in FIG. 5B where the detection value of the pressure of the combustion chamber 6 becomes larger than the set value and the total opening degree command value is changed to be 110%.

In this example, nozzles facing to opposite directions are referred as a nozzle group. For example, the nozzles 16-1 and 16-3 facing to opposite directions are referred as a first nozzle group, and the nozzles 16-2 and 16-4 facing to opposite directions are referred to as a second nozzle group. In the same nozzle group, the opening degree correction values are distributed to the nozzles with a same ratio.

In FIG. 5A, a total value T1 of the opening degree command values for the first nozzle group is "70+10=80%", and a total value T2 of the opening degree command values for the second nozzle group is "10+10=20%". In this case, the total correction value "10%" is distributed to the first nozzle group with a ratio of T2/(T1+T2), and to the second nozzle group with a ratio of 11/(11+12). Accordingly, in the example shown in FIG. 5A, the total correction value is distributed to the first nozzle group by 2%, and to the second nozzle group by 8%. The correction value is evenly distributed into the nozzles of the first group 16-1, 16-3, the correction value is evenly distributed into the nozzles of the second group 16-2, 16-4, and thereby the correction values shown in FIG. 5B are obtained.

According to such control, when the combustion pressure becomes larger than the set value, the total correction value for the combustion gas is evenly distributed in opposite directions without changing the orbit. Moreover, the total correction value is largely distributed to a nozzle group having small opening degree command values. Accordingly, the opening degrees of the pintle valves 16-1 to 16-4 after the correction are more even than those before the correction. The plurality of nozzles 15-1 to 15-4 of the divert thruster 8 are desirably used evenly rather than used disproportionately. According to control shown in FIGS. 5A and 5B, such more evenly-used control can be attained.

Figure 6:
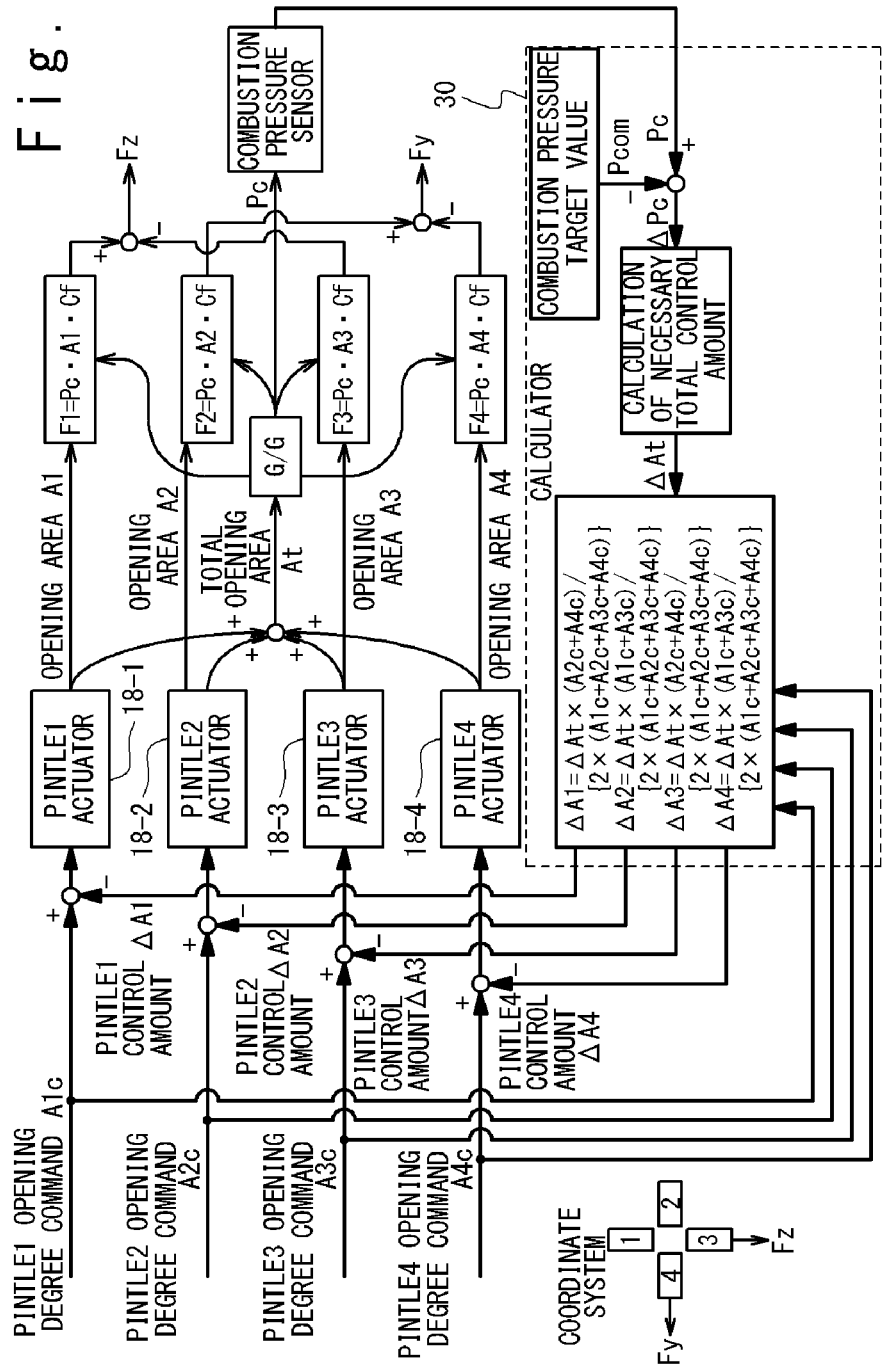
FIG. 6 is a diagram for explaining an operation of a control section.

FIG. 6 shows a configuration of a control section 17 for realizing the above mentioned control. Opening degree commands A1*c* to A4*c* for the pintle valves 16-1 to 16-4 are inputted into the control section 17, based on a wireless communication or data stored in a storage section. These values are corrected by correction values $\Delta A1$ to $\Delta A4$ for the opening degree commands of the pintle valves 16-1 to 16-4, respectively. The control section 17 outputs the corrected opening degree commands to respective actuators 18-1 to 18-4 of the pintle valves 16-1 to 16-4. The actuators 18-1 to 18-4 drive, opening areas of the pintle valves 16-1 to 16-4 are respectively set to be A1 to A4, and a total opening area At is determined. Following thrust forces are obtained by injection from each of the nozzles 15-1 to 15-4.

F1=Pc·A1·Cf
F2=Pc·A2·Cf
F3=Pc·A3·Cf
F4=Pc·A4·Cf

The Pc indicates the pressure of the combustion chamber 6, and Cf indicates a thrust coefficient. A thrust force along the z-axis direction is determined by a difference between F1 and F3. A thrust force along the y-axis direction is determined by a difference between F2 and F4.

The Pressure Pc of the combustion chamber 6 is detected by the combustion pressure sensor 7. A calculator provided in the control section 17 calculates a total correction value $\Delta At$ that is a correction value for the total opening area At, based on a deviation $\Delta Pc$ between the detected pressure Pc and a combustion pressure target value Pcom which is provided by data stored in the storage section, in order to carry out feed back control that is typically PID control.

The calculator of the control section 17 distributes the total correction value $\Delta At$ to the correction values $\Delta A1$ to $\Delta A4$ for the pintle valves 16-1 to 16-4. This distribution is carried out according to the following formulas.

$$\Delta A1 = \Delta A_t \times (A2_c + A4_c) / \{2 \times (A1_c + A2_c + A3_c + A4_c)\}$$

$$\Delta A2 = \Delta A_t \times (A1_c + A3_c) / \{2 \times (A1_c + A2_c + A3_c + A4_c)\}$$

$$\Delta A3 = \Delta A_t \times (A2_c + A4_c)/\{2 \times (A1_c + A2_c + A3_c + A4_c)\}$$

$$\Delta A4 = \Delta A_t \times (A1_c + A3_c)/\{2 \times (A1_c + A2_c + A3_c + A4_c)\}$$

By using these correction values as the correction values for the opening degree commands A1c to A4c for the pintle valves 16-1 to 16-4, the total opening degree correction value is largely distributed into a nozzle group having small opening degree command values, and the pressure of the combustion chamber 6 is kept constant.

[Control of Correcting the Opening Degree by a Measurement Value of Acceleration]

Figure 7:
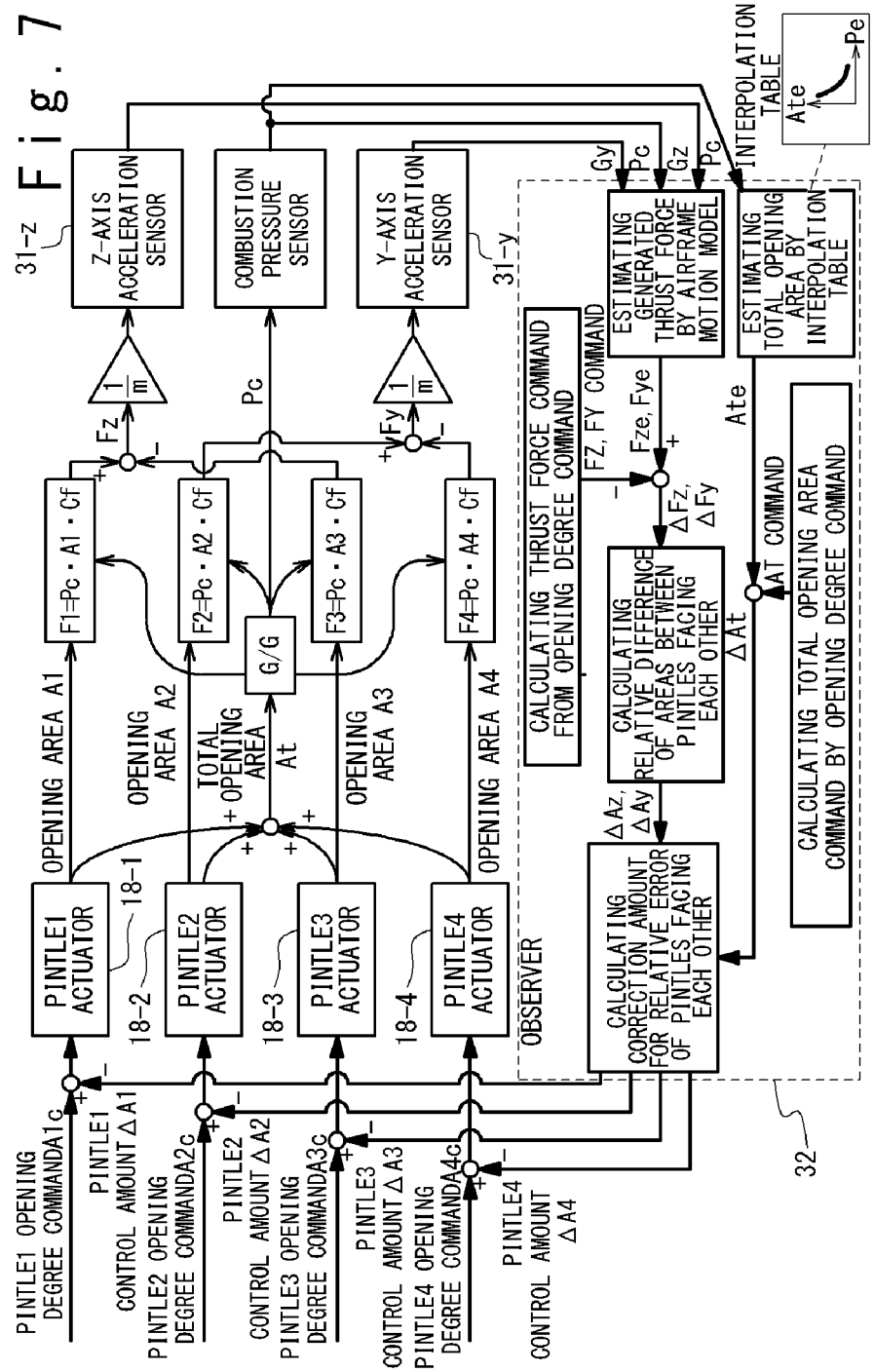
FIG. 7 is a diagram for explaining an operation of a control section.

As mentioned above, the example was explained in a case where the divert thruster is controlled in response to a change of the pressure in the combustion chamber. On the other hand, in order that the flying object accurately flies along an orbit according to commands, feed back control using a measurement value of acceleration of the flying object is desired. FIG. 7 shows an example of such control.

The orbit attitude control device includes an acceleration sensor section. The acceleration sensor section includes a y-axis acceleration sensor for measuring acceleration in the y-axis direction of the coordinate axes illustrated in FIG. 1A and FIG. 2A, and a z-axis acceleration sensor for measuring acceleration in the z-axis direction.

Respective opening degree commands A1c to A4c for each of the pintle valves 16-1 to 16-4 are inputted into the control section 17, by a wireless communication or based on data stored in a storage section. These values are corrected by correction values ΔA1 to ΔA4 for the opening degree commands of the respective pintle values 16-1 to 16-4. The control section 17 outputs the corrected opening degree commands to respective actuators 18-1 to 18-4 of the pintle valves 16-1 to 16-4. Actuators 18-1 to 18-4 drive, the opening areas of the pintle valves 16-1 to 16-4 are respectively set to be A1 to A4, and the total opening area At is determined. The following thrust forces are obtained by the injection from the each of nozzles 15-1 to 15-4.

F1=Pc·A1·Cf
F2=Pc·A2·Cf
F3=Pc·A3·Cf
F4=Pc·A4·Cf

The Pc indicates the pressure of the combustion chamber 6, and Cf indicates the thrust coefficient. A thrust force Fz along the z-axis direction is determined by a difference between F1 and F3. A thrust force Fy along the y-axis direction is determined by a difference between F2 and F4. Accelerations along the y-axis and z-axis are generated in the flying object, by the thrust forces Fy and Fz.

The y-axis acceleration sensor and the z-axis acceleration sensor detect a y-axis acceleration Gy and a z-axis acceleration Gz, respectively. An observer 32 provided in the control section 17 corrects the opening degree command values of the divert thruster based on these accelerations. A storage device in the observer 32 stores an inertia model of the flying object. The observer 32 calculates estimated values of a thrust force Fye along the y-axis direction and a thrust force Fze along the z-axis direction, based on this inertia model, the inputted y-axis acceleration Gy and z-axis acceleration Gz.

The observer 32 transforms the opening degree commands A1c to A4c of the pintle valves into command values for the thrust forces along the y-axis direction and the z-axis direction, based on a previously prepared formula or a table. Furthermore, the observer 32 calculates deviations ΔFy, ΔFz between these command values for the thrust forces and estimated values Fye, Fze for the thrust forces. A correction value ΔAz of a relative difference between the opening degrees of pintle valves 16-1 and 16-3 of the first group is calculated so that the deviation ΔFz becomes smaller. A correction value ΔAy of a relative difference between the opening degrees of pintle valves 16-2 and 16-4 of the second group is calculated so that the deviation ΔFy becomes smaller.

When ΔAy and ΔAz are evenly distributed to the pintle valves facing to each other, following correction amounts are distributed to the each pintle valve.

ΔA1:+ΔAz/2
ΔA2:+ΔAy/2
ΔA3:−ΔAz/2
ΔA4:−ΔAy/2

Furthermore, in the control method according to the present embodiment which is against the change of the detection value of the pressure of the combustion chamber 6, when the function f (opening degree command) is a proportional function, the opening degree correction values ΔA1 to ΔA4 for the each of pintle valves are determined as follows.

$$\Delta A1 = \Delta A_t \times (A2_c + A4_c)/\{2 \times (A1_c + A2_c + A3_c + A4_c)\} + \Delta A_z/2$$

$$\Delta A2 = \Delta A_t \times (A1_c + A3_c)/\{2 \times (A1_c + A2_c + A3_c + A4_c)\} + \Delta A_y/2$$

$$\Delta A3 = \Delta A_t \times (A2_c + A4_c)/\{2 \times (A1_c + A2_c + A3_c + A4_c)\} + \Delta A_z/2$$

$$\Delta A4 = \Delta A_t \times (A1_c + A3_c)/\{2 \times (A1_c + A2_c + A3_c + A4_c)\} + \Delta A_y/2$$

The orbit of the flying object can be accurately controlled, by feed back control of the detection value of the acceleration about the injection direction of the divert thruster. Moreover, control for keeping the combustion pressure constant can be realized.

Although the present invention has described above in connection with several embodiments thereof, it would be apparent to those skilled in the art that those embodiments are provided solely for illustrating the present invention, and should not be relied upon to construe the appended claims in a limiting sense.

What is claimed is:

1. An orbit attitude control device, comprising:
   a plurality of nozzles configured to inject combustion gas supplied from a combustion chamber, in which opening degrees are configured to be controlled in accordance with opening degree command values; and
   a control section configured to calculate nozzle opening degree correction values that are correction values for opening degree command values so that a deviation between a detection value of a pressure of the combustion chamber and a command value of the pressure becomes smaller to correct the opening degree command values by the nozzle opening degree correction values,
   wherein first group nozzles which belong to a first group of the plurality of nozzles are configured to inject combustion gas in opposite directions along a first axis, a second group nozzles which belong to a second group of the plurality of nozzles are configured to inject combustion gas in opposite directions along a second axis,
   wherein the control section is configured to:
   calculate a total correction value that is a correction value for a total of the opening degree command values for the plurality of nozzles so that the deviation between the detection value of the pressure and the command value of the pressure becomes smaller;
   calculate a total first group opening degree value T1 that is a total of the opening degree command values for the first group nozzles, and a total second group opening degree value T2 that is a total of the opening degree command values for the second group nozzles;

distribute the total correction value into a first group opening degree correction value with a ratio of T2/(T1+T2) and into a second group opening degree correction value with a ratio of T1/(T1+T2);

calculate the nozzle opening degree correction values for the first group nozzles so that a total value becomes the first group opening degree correction value; and calculate the nozzle opening degree correction values for the second group nozzles so that a total value becomes the second group opening degree correction value.

2. The orbit attitude control device according to claim 1, wherein the control section is configured to:

calculate the nozzle opening degree correction values for the first group nozzles, by distributing the first group opening degree correction value to the each of the first group nozzles in proportion to each of the opening degree command values; and calculate the nozzle opening degree correction values for the second group nozzles, by distributing the second group opening degree correction value to the each of the second group nozzles in proportion to each of the opening degree command values.

\* \* \* \* \*